SOLID STATE SWITCH

Filed Sept. 15, 1967

INVENTOR.
IRVING ROTH
BY S. C. Yeaton
ATTORNEY

United States Patent Office 3,532,903

Patented Oct. 6, 1970

3,532,903

SOLID STATE SWITCH

Irving Roth, Williston Park, N.Y., assignor to Sperry Rand Corporation, a corporation of Delaware Filed Sept. 15, 1967, Ser. No. 668,008
Int. Cl. H03k 17/00
U.S. Cl. 307—253 6 Claims

ABSTRACT OF THE DISCLOSURE

A circuit comprising a transistor interconnected with a controlled rectifier, a diode and a charging and discharging voltage supply for repetitively switching power from an external source on and off to a load element in response to an input signal, the controlled rectifier operating in conjunction with the diode and voltage supply both to apply power to the load and to preclude current flow in the collector of the transistor during its turn on time thereby enhancing the rise time of the pulses applied to the load and reducing the power dissipated in the transistor.

BACKGROUND OF THE INVENTION

This invention relates to repetitively actuated switching circuits for controlling the power applied to a load element and more particularly to means in such circuits for decreasing the power dissipation therein and enhancing the rise time of the pulses applied to the load.

Reliability, power rating and switching speed are factors which must be considered when selecting a switch for a particular application. Electromechanical and other nonsolid state switching devices are capable of operating at high power levels but are generally less reliable than solid state devices. Irrespective of reliability and power power considerations, however, if the required switching rate exceeds the response time of nonsolid state devices, switching speed becomes the decisive factor, thus necessitating the use of solid state components such as transistors, controlled rectifiers and silicon controlled switches. When solid state components are used, another factor must be taken into account, namely, the capability for controllably switching between the on and off states. The silicon controlled switch, for example, is a high speed device which can be switched on and off but it is restricted to low power applications. The controlled rectifier, on the other hand, can operate at both high speeds and high power levels but cannot be controllably switched to the off state. It is driven into a high conductivity, low impedance state, wherein it functions as a closed switch, by applying a trigger pulse to its gate terminal at a time when the anode is positively biased with respect to the cathode. Thereafter, the gate is ineffective until the forward-bias is removed from the anode and cathode terminals, at which time the device reverts to the nonconductive, high impedance state where it functions as an open switch. Since this is the only means by which the controlled rectifier can be turned off, it is not suitable for repetitive, accurately controlled switching.

Unlike the controlled rectifier, a transistor can be switched on and off, that is, switched between nonconductive and saturated conductivity states in which it operates as an open and closed switch, respectively, by controlling the magnitude of the signal applied to its base terminal. But the transistor cannot switch as rapidly as the silicon controlled switch or the controlled rectifier because its response time is longer. Moreover, considerable power is dissipated in a transistor during the switching intervals. In the conductive state, the voltage at the collector is very low and in the nonconductive state no current flows in the collector so that power dissipation is negligible in both cases. During a switching interval, however, a situation develops in which both the current and voltage are momentarily at comparatively high values. Consequently, high instantaneous power dissipation occurs. This is not detrimental to either the operation or reliability of the transistor but it does impose a limit on the maximum switching rate to assure that the average power dissipation does not become excessive. Base clearing circuits have been developed in the prior art to reduce transistor power dissipation when switching from the on to the off conditions but as yet no techniques have been developed for reducing power dissipation which occurs when switching in the opposite direction.

SUMMARY OF THE INVENTION

The present invention teaches a switching circuit comprising a transistor interconnected with a controlled rectifier and a diode to overcome the aforementioned limitations of switching devices. A trigger pulse applied to the gate of the controlled rectifier concurrent with a turn on signal applied to the base of the transistor enables the controlled rectifier to supply power to a load element almost instantaneously and to preclude current from flowing through the collector of the transistor during its turn on time, that is, during the interval when it is switching from a nonconductive to a saturated conductive state. A charged storage element connected to the controlled rectifier discharges therethrough at a rate proportional to the turn on time of the transistor such that the controlled rectifier becomes back-biased and reverts to a nonconductive state at approximately the same instant that the transistor reaches saturation. Thereafter, power is supplied to the load through the transistor so it can be interrupted simply by changing the level of the base signal. Since no current flows in the collector during the turn on time the instantaneous power dissipation is substantially reduced, thus permitting the switching rate to be increased.

DESCRIPTION OF THE PREFERRED EMBODIMENT

Figure 1:
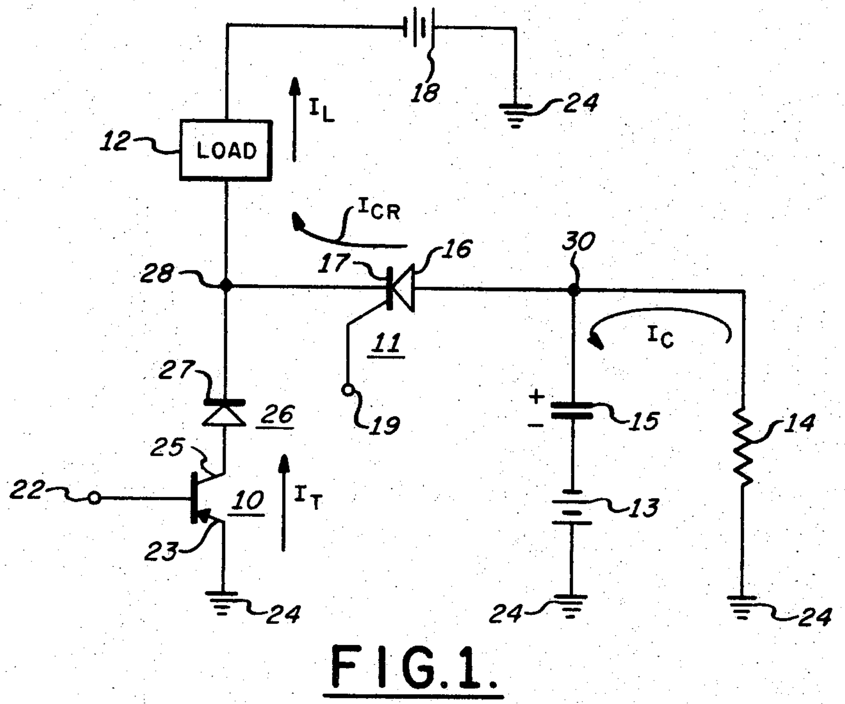
FIG. 1 is a circuit diagram of an embodiment of the invention.
Figure 2:
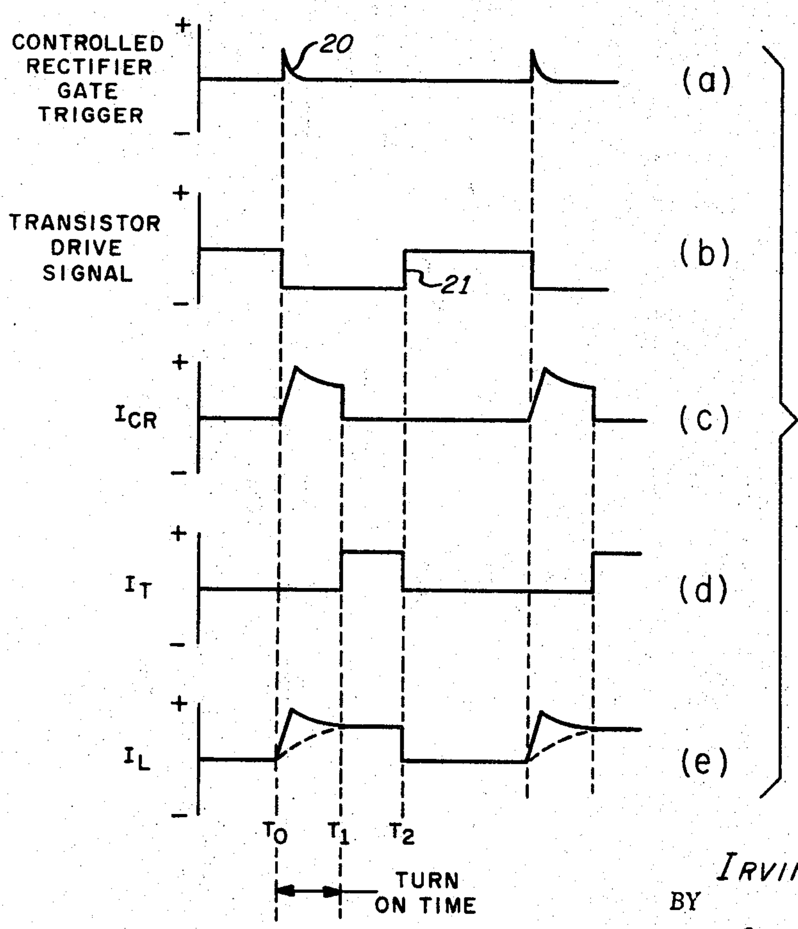
FIGS. 2*a* through 2*e* are illustrations of current and voltage waveforms at various points in the circuit of FIG. 1.

Referring to FIG. 1, to describe the invention it will be assumed that power has just been applied to the circuit and that both transistor 10 and controlled rectifier 11 are initially nonconducting so that no current is flowing through load element 12. Voltage supply 13 instantly causes current $I_C$ to flow through resistor 14 and capactor 15 until the capacitor is charged to the value of the supply voltage with polarity as indicated. Since the positively charged plate of the capacitor is connected directly to anode 16 while cathode 17 is at the negative potential of source 18, the controlled rectifier may be driven into a high conductivity state in which the impedance across the anode and cathode (the switch terminals) is very low by placing gate 19 (the control terminal) at a positive potential with respect to the cathode. Inasmuch as the cathode is negatively biased, this may be accomplished by momentarily connecting the gate terminal to ground or by applying a positive trigger pulse 20 (FIG. 2*a*) to the gate at time $T_0$. The response time of the controlled rectifier is extremely fast so it switches from a non-conductive to a conductive state almost instantaneously thereby providing a fast rise time current pulse $I_{CR}$ (FIG. 2*c*) to the load element, the current path being from voltage supply 13 through the capacitor, controlled rectifier and load into voltage source 18. At the same instant that the postive trigger pulse is applied to the gate of the controlled rectifier a drive signal 21 (FIG. 2*b*) applied to the base 22 (the control terminal) of the transistor changes to a relatively more negative value causing current to flow into the base from emitter 23 which is connected to ground 24 or some other suitable reference point. In some instances, depending on whether the controlled rectifier has a small dwell time in the off state before reacting to the trigger pulse 20, it may be necessary to delay the base drive signal 21 somewhat relative to the trigger pulse. Generally, this will not be necessary, however, in which case the trigger pulse may be obtained, for example, simply by inverting and differentiating the base drive signal. As previously mentioned, the transistor has a slower response than the controlled rectifier so it does not turn on as rapidly. It will be appreciated, therefore, that if the transistor was used by itself the current pulses applied to the load would have a slow rise time as indicated by the dashed line in FIG. 2*e* causing considerable power to be dissipated in the transistor. The present invention overcomes these problems by using the controlled rectifier to supply power to the load while the transistor is turning on. During the transistor turn on interval, current is precluded from flowing in the collector 25 because diode 26 is back-biased by the positive charge on the capacitor which is connected through the low impedance of the controlled rectifier to junction 28 between one end of the load and cathode 27 of the diode. As current $I_{CR}$ continues to flow through the load, capacitor 15 discharges until the controlled rectifier becomes back-biased, at which time ($T_1$) current $I_{CR}$ is interrupted and current $I_T$ (FIG. 2*d*) begins to flow in the emitter and collector (the switch terminals) of the transistor through the diode and load into voltage source 18, the total load current $I_L$ (FIG. 2*e*) therefore being equal to $I_{CR}+I_T$. Immediately as the controlled rectifier turns off, capactor 15 begins to charge again in readiness for the next trigger pulse and thereafter the current flowing through the load may be terminated simply by returning the transistor drive signal to a more positive level as indicated at $T_2$. The discharge rate of capacitor 15 is proportioned to be approximately equal to the turn on time of the transistor so that current $I_T$ does not begin to flow until the transistor has reached the saturated conduction state in which the potential across its collector and emitter terminals is very low. As a result, both the instantaneous and average power dissipation in the transistor are minimized thereby enabling the circuit to operate at considerably faster switching rates. To assure that the circuit operates as described, the positive trigger pulse applied to the gate of the controlled rectifier must be of shorter duration that the negative going portion of the transistor base drive signal and preferably shorter than the turn on time of the transistor.

It should be apparent from the foregoing description that the power supply circuit consisting of voltage supply 13, resistor 14 and capacitor 15 is required solely to provide a varying voltage at point 30. Other conventional means may be used to provide this voltage but generally a capacitive storage element charged by a D.C. supply is preferred because of its simplicity. Likewise, elements 10, 11 and 26 which are specifically cited as a transistor, controlled rectifier and diode, respectively, may be replaced by other components having similar characteristics. The transistor, for example, may be replaced by a phototransistor which switches in response to an optical rather than an electrical input signal.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A circuit for controlling the power supplied to a load from a power source comprising first and second switches each having a control terminal and first and second switch terminals, means for connecting respective control signal sources to the respective control terminals, the first and second switches being responsive to the respective control signals for switching power onto the load but only the first switch being responsive to a control signal for switching power off from the load, a unidirectional current conductive element interconnecting a switch terminal of the first switch with a switch terminal of the second switch, an output terminal connected to the junction between the unidirectional current conductive element and the second switch, said output terminal being adapted for connection to the load, a charging and discharging power supply circuit comprising an energy storage element connected to the other switch terminal of the second switch, the storage element being connected in the power supply circuit such that it charges when the second switch is off and discharges when said second switch is on, the discharge being through the second switch so as to supply power to the load and back bias the unidirectional current conductive element during the turn-on time of the first switch and the discharge rate being proportional to said turn-on time whereby the second switch reverts to the off state at the termination of the discharge and power is supplied thereafter to the load through said first switch until the control signal is removed from its control terminal.

2. The apparatus of claim 1 wherein the first switch is a transistor having a base which functions as the control terminal and an emitter and a collector which function as the respective switch terminals, the transistor being connected in a common emitter configuration.

3. The apparatus of claim 1 wherein the second switch is a controlled rectifier having a gate which functions as the control terminal and an anode and a cathode which function as the respective switch terminals.

4. The apparatus of claim 2 wherein the second switch is a controlled rectifier having a gate which functions as the control terminal and an anode and a cathode which function as the respective switch terminals, and the unidirectional current conductive device is a diode oppositely poled to both the base-collector and anode-cathode junctions of the transistor and controlled rectifier, respectively.

5. The apparatus of claim 4 wherein the storage element is a capacitor and the power supply circuit also comprises a resistor and a voltage source, the capacitor, resistor and voltage source being connected to form an RC charging network when the controlled rectifier is nonconducting.

6. The apparatus of claim 5 wherein the resistor is connected in parallel with the series arrangement of the capacitor and voltage source, the junction of said capacitor and said resistor being connected to said other switch terminal of said second switch.

References Cited

UNITED STATES PATENTS

| | | | |
|---|---|---|---|
| 2,885,572 | 5/1959 | Felker | 307—207 |
| 3,329,838 | 7/1967 | Meyers | 307—252 |

DONALD D. FORRER, Primary Examiner

D. M. CARTER, Assistant Examiner

U.S. Cl. X.R.

307—246, 252, 263, 300